(12) United States Patent
Dringenberg et al.

(10) Patent No.: US 9,481,308 B2
(45) Date of Patent: Nov. 1, 2016

(54) GRILLE-STEP ASSEMBLY MOUNTABLE TO A VEHICLE

(71) Applicant: ALL SALES MANUFACTURING, INC., El Dorado Hills, CA (US)

(72) Inventors: Steven A. Dringenberg, Camino, CA (US); Timothy D. Manning, Sr., Cameron Park, CA (US); Timothy D. Manning, Jr., Rescue, CA (US)

(73) Assignee: All Sales Manufacturing, Inc., El Dorado Hills, CA (US)

( * ) Notice: Subject to any disclaimer, the term of this patent is extended or adjusted under 35 U.S.C. 154(b) by 49 days.

(21) Appl. No.: 14/519,551

(22) Filed: Oct. 21, 2014

(65) Prior Publication Data

US 2016/0107580 A1    Apr. 21, 2016

(51) Int. Cl.
*B60R 3/00*    (2006.01)
*B60R 3/02*    (2006.01)
*B60R 19/52*   (2006.01)

(52) U.S. Cl.
CPC . *B60R 3/02* (2013.01); *B60R 19/52* (2013.01)

(58) Field of Classification Search
CPC ........... B60R 3/00; B60R 3/02; B60R 3/005; B60R 3/007; B60D 23/02
See application file for complete search history.

(56) References Cited

U.S. PATENT DOCUMENTS

| 242,939 | A | * | 6/1881 | Koehler | B60R 3/02 182/156 |
|---|---|---|---|---|---|
| 752,031 | A | * | 2/1904 | Chadwick | B60R 3/02 280/166 |
| 870,442 | A | * | 11/1907 | Kneeland | B61D 23/02 105/449 |
| 893,930 | A | * | 7/1908 | Lederman | A47K 3/122 108/47 |
| 999,653 | A | * | 8/1911 | Jones | B61D 23/02 105/449 |
| 1,760,422 | A | * | 5/1930 | Mackie | B60R 3/02 280/166 |
| 1,877,152 | A | * | 9/1932 | Vogel | B60R 3/02 280/166 |
| 2,880,016 | A | * | 3/1959 | Peterson | B60D 1/54 280/482 |
| 3,749,436 | A | * | 7/1973 | Hitchcock | B62D 49/02 224/410 |

(Continued)

*Primary Examiner* — J. Allen Shriver, II
*Assistant Examiner* — Travis Coolman
(74) *Attorney, Agent, or Firm* — Renner Kenner Greive Bobak Taylor & Weber

(57) ABSTRACT

A grille-step assembly mounted on a vehicle includes a vehicle having a vehicle frame and a grille-step assembly secured to the frame. The grille-step assembly includes a grille frame secured to the vehicle frame. The grille frame has opposed grille brackets with at least one bar connecting the opposed grille brackets to one another and a step assembly. The step assembly includes opposed step brackets having a bottom crossbar and a step crossbar that connect the opposed step brackets to one another. The assembly is releasably mounted so that in a closed position both the bottom crossbar and the step crossbar are positioned between the opposed grille brackets, and in an open position one of the bottom crossbar and step crossbar is positioned away from the opposed grille brackets.

10 Claims, 7 Drawing Sheets

(56) References Cited

U.S. PATENT DOCUMENTS

| | | | | |
|---|---|---|---|---|
| 3,756,622 | A * | 9/1973 | Pyle | B60R 3/02 280/166 |
| 4,125,214 | A * | 11/1978 | Penn | B60R 9/06 224/508 |
| 4,848,821 | A * | 7/1989 | Llewellyn | E06C 5/02 280/166 |
| 4,911,264 | A * | 3/1990 | McCafferty | B60R 3/007 182/150 |
| 5,067,760 | A * | 11/1991 | Moore | B60R 19/52 180/68.6 |
| 5,139,295 | A * | 8/1992 | Escobedo | B60R 3/00 182/90 |
| 5,803,475 | A * | 9/1998 | Dick | B60R 3/007 280/163 |
| D448,335 | S * | 9/2001 | Ehnes | D12/203 |
| 6,447,032 | B1 * | 9/2002 | Howell, Sr. | B60R 9/06 211/59.2 |
| 6,457,558 | B1 * | 10/2002 | Ehnes | B25H 5/00 182/150 |
| 6,550,578 | B1 * | 4/2003 | Law | B60R 3/007 182/150 |
| 6,612,595 | B1 * | 9/2003 | Storer | B60R 3/00 280/163 |
| 6,663,125 | B1 * | 12/2003 | Cheng | B60R 3/02 280/166 |
| 6,682,111 | B1 * | 1/2004 | Houseman | B60R 19/46 293/115 |
| 7,168,722 | B1 * | 1/2007 | Piotrowski | B60R 3/02 280/166 |
| D572,180 | S * | 7/2008 | Storer | D12/171 |
| D577,319 | S * | 9/2008 | Storer | D12/171 |
| 8,182,013 | B1 * | 5/2012 | Alvarado | B60R 3/007 182/127 |
| D669,504 | S * | 10/2012 | Higashikawa | D15/28 |
| 8,585,107 | B2 * | 11/2013 | Kekich, Jr. | B60R 19/52 293/115 |
| D696,424 | S * | 12/2013 | Bonser | D25/64 |
| D699,270 | S * | 2/2014 | Beidler | D15/28 |
| 2003/0201288 | A1 * | 10/2003 | Ford | B60R 9/06 224/310 |
| 2005/0173191 | A1 * | 8/2005 | Linzmayer | B60R 3/007 182/127 |
| 2006/0066121 | A1 * | 3/2006 | Derosier | B60R 3/02 296/62 |
| 2009/0014978 | A1 * | 1/2009 | Shumway | B60R 3/02 280/166 |
| 2010/0089698 | A1 * | 4/2010 | Brodsack | E06C 5/04 182/127 |
| 2013/0048400 | A1 * | 2/2013 | Holdener | B60R 3/02 180/89.1 |
| 2014/0110193 | A1 * | 4/2014 | Conley | B60R 3/02 182/91 |
| 2015/0329055 | A1 * | 11/2015 | Clanton | B60R 3/02 280/166 |

* cited by examiner

GRILLE-STEP ASSEMBLY MOUNTABLE TO A VEHICLE

TECHNICAL FIELD

The present invention is directed to grille guards used with vehicles. In particular, the present invention is directed to grille guards which provide a step to allow a mechanic or other person to work on an engine underneath the hood of the vehicle. The step is movable so that in one position it appears to be part of the grille guard and in another position allows for use as a step.

BACKGROUND ART

Front grille guards are mounted on vehicles to protect the radiator grille and/or front bumper of the vehicle. In most uses, grille guards are used with pick-up trucks and sport utility vehicles but they could also be used with sedans and off-road vehicles. Although primarily for utilitarian purposes such as preventing brush and other debris from impacting the radiator grille, the guards are coming into wide acceptance for decorative and aesthetic purposes.

One problem with currently manufactured grille guards is that they further remove a mechanic from accessing the engine and other related components underneath the hood of the vehicle. Skilled artisans will appreciate that many such vehicles are already quite large and do not allow for easy access to components under the hood. This is especially problematic for "lifted" trucks wherein extremely large tires are utilized to lift the truck a considerable distance above ground. As such, the grilles further exacerbate the problem of accessing the vehicle's engine. Therefore, there is a need to allow for a mechanic to access components underneath the hood while utilizing features of the grille.

SUMMARY OF THE INVENTION

In light of the foregoing, it is a first aspect of the present invention to provide a grille-step assembly mountable to a vehicle.

It is another aspect of the present invention to provide a grille-step assembly mounted on a vehicle, comprising a vehicle having a vehicle frame, a grille-step assembly secured to the frame, the grille-step assembly comprising a grille frame secured to the vehicle frame, the grille frame having opposed grille brackets having at least one bar connecting the opposed grille brackets to one another, and a step assembly comprising opposed step brackets having a bottom crossbar and a step crossbar connecting the opposed step brackets to one another, wherein the assembly is releasably mounted such that in a closed position both the bottom crossbar and the step crossbar are positioned between the opposed grille brackets and in an open position one of the bottom crossbar and step crossbar is positioned away from the opposed grille brackets.

Yet another aspect of the present invention is to provide a grille-step assembly adapted to be mounted to a vehicle frame in proximity to the vehicle's hood, the assembly comprising a grille frame having opposed grille brackets and at least one fixed bar extending substantially perpendicularly from and connecting the opposed grille brackets to one another, and a step assembly having opposed step brackets and at least two crossbars extending substantially perpendicularly from and connecting the opposed step brackets to one another, wherein the step brackets are positioned adjacent and within the opposed grille brackets, wherein the step assembly is releasably mounted such that in a closed position the at least two crossbars are positioned between the opposed grille brackets and wherein in an open position one of the crossbars is positioned away from the opposed grille brackets.

BRIEF DESCRIPTION OF THE DRAWINGS

These and other features and advantages of the present invention will become better understood with regard to the following description, appended claims, and accompanying drawings wherein:

DETAILED DESCRIPTION OF THE INVENTION

Figure 1:
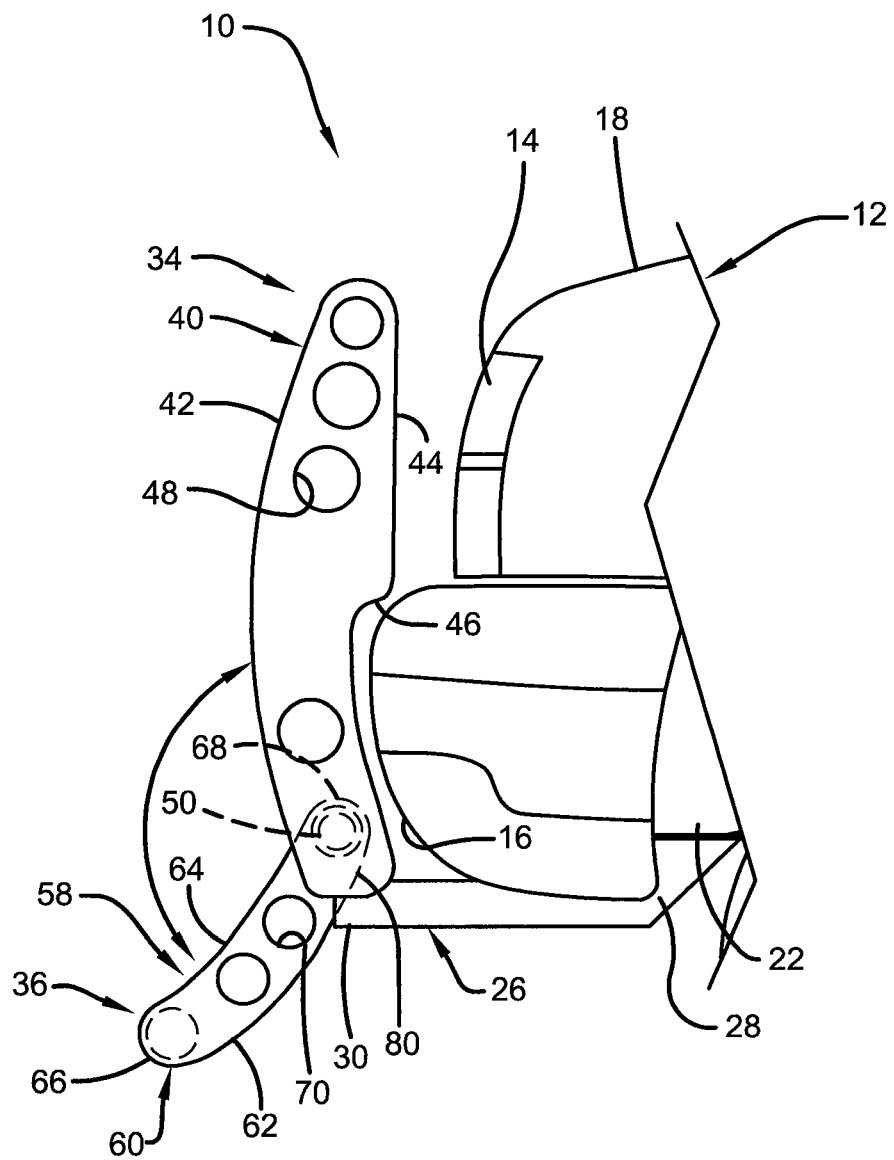
FIG. 1 is a partial elevational view of a grille-step assembly mounted on a vehicle according to the concepts of the present invention.

Referring now to the drawings and, in particular, to FIGS. 1-5, it can be seen that a grille-step assembly is designated generally by the numeral 10. As best seen in FIG. 1, the grille-step assembly is mountable to a vehicle 12 such as a pick-up truck, sports utility vehicle, or the like. The vehicle 12 provides a radiator grille 14 that is protected by an outwardly extending front bumper 16. The vehicle also provides a hood 18 which protects the engine and other vehicle components normally maintained under the hood of the vehicle. A frame 22 supports the vehicle 12 and allows for mounting of the grille-step assembly. In one embodiment, a bracket 26 includes a frame end 28 connected to the frame 22 and a grille end 30 that extends outwardly from an underside of the bumper 16. As will be discussed, the assembly 10 is mounted to the grille end 30 and, as a result, the vehicle 12. Other structural mechanisms may be employed to secure the grille-step assembly 10 to the vehicle 12. For example, in one embodiment the assembly 10 may be mounted directly to the grille 14 and/or the bumper 16.

The grille-step assembly 10 includes a grille frame 34 and a swing step assembly 36. The grille frame 34 includes a pair of opposed grille brackets 40 which, in this embodiment, are of the same shape and configuration. Other shapes and configurations may be used. Each grille bracket 40 includes a front edge 42 which may be curved or any other shape as desired. Opposite the front edge 42 is a bumper edge 44 which may provide a bumper notch 46. The bumper edge 44 conforms or somewhat conforms to the profile shape of the radiator grille 14 and the bumper 16. Of course, any curvilinear or linear shape could be used for the front edge or bumper edge. Each grille bracket 40 may be provided with decorative holes 48 which may be utilized to reduce the weight of the grille brackets without adversely affecting the strength of the bracket. The bottom portion of the bracket 40 may provide for an assembly hole 50 that is used to connect the swing step assembly 36 to the grille frame 34. At least one mounting hole 52 may be provided through each bracket 40 near the bumper edge 44. The mounting hole(s) 52 receive fasteners or the like to secure each bracket 40 to the grille end 30 of the bracket 26. A top crossbar 54 connects top ends of the grille brackets 40 to one another. In some embodiments, lights 56, which may be light emitting diodes or other illumination devices, may be installed into the bar for decorative or safety purposes. Reflective surfaces may be used in place of or in combination with the lights 56.

Figure 2:
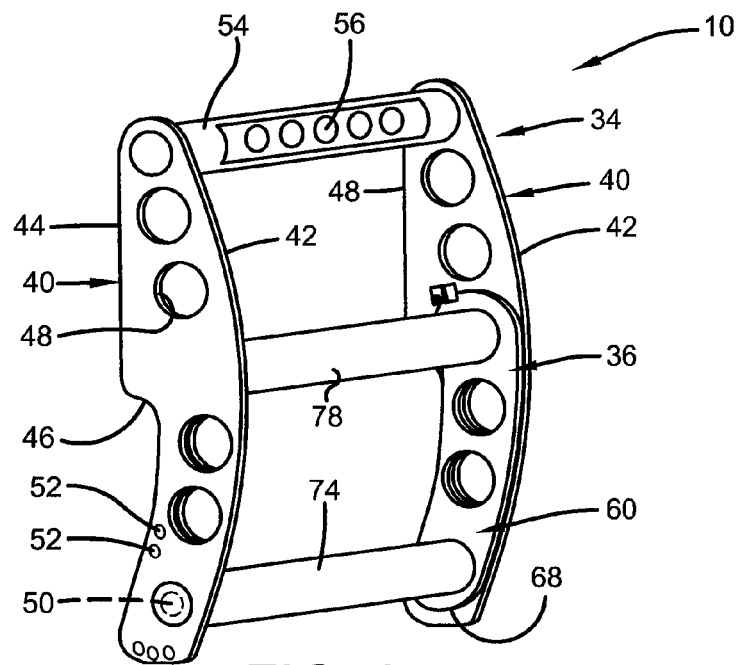
FIG. 2 is a front perspective view of the grille-step assembly shown in a closed position according to the concepts of the present invention.
Figure 3:
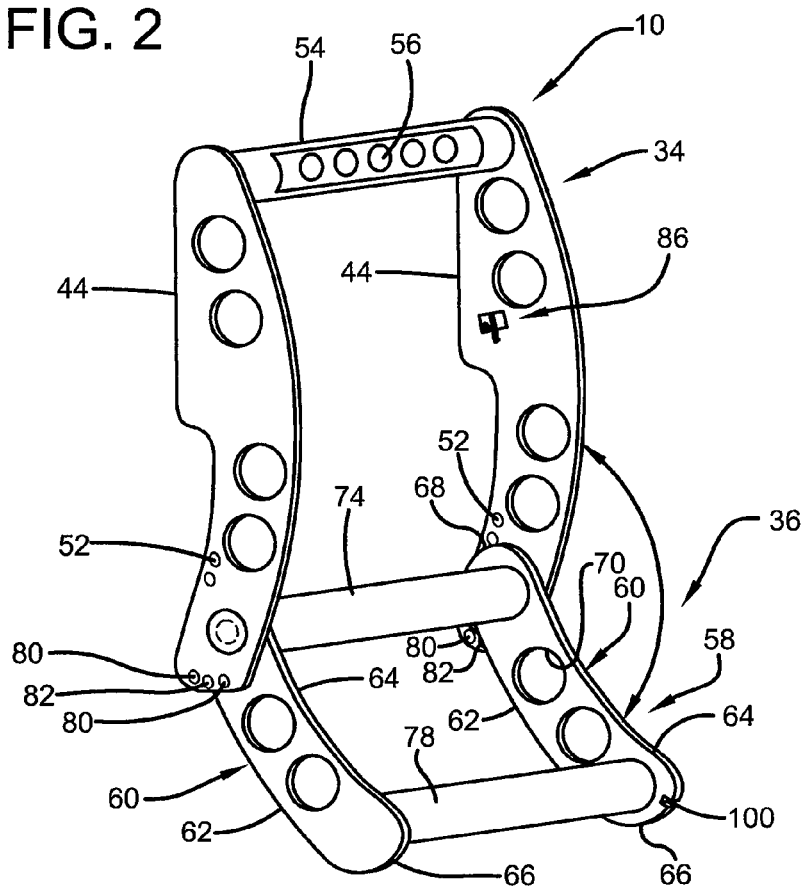
FIG. 3 is a front perspective view of the grille-step assembly shown in an open position according to the concepts of the present invention.
Figure 4:
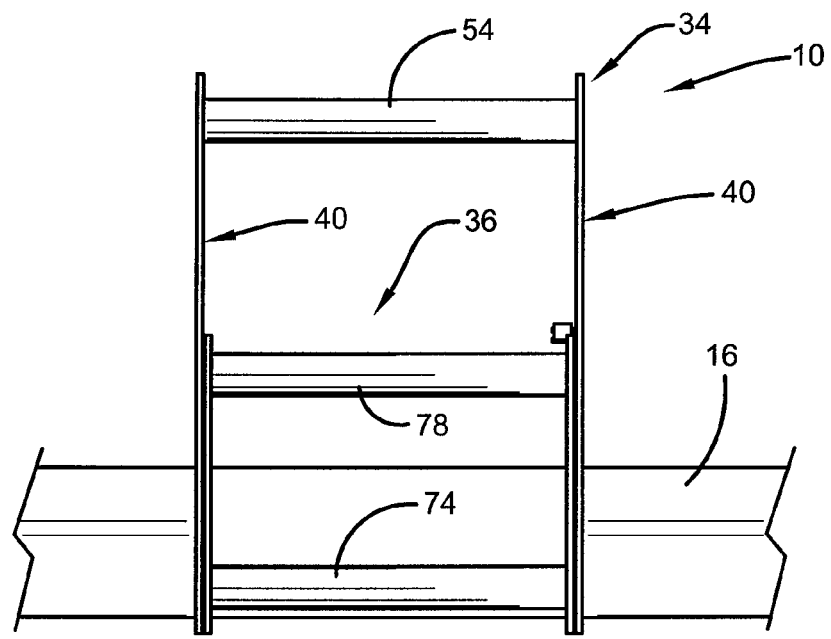
FIG. 4 is a front elevational view of the grille-step assembly shown in a closed position according to the concepts of the present invention.
Figure 5:
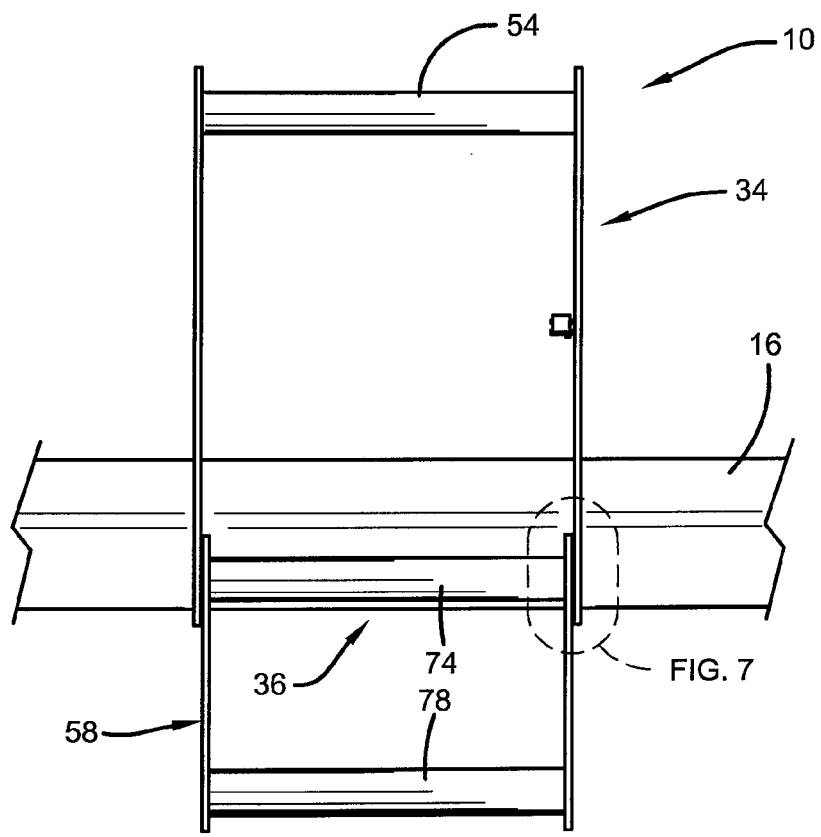
FIG. 5 is a front elevational view of the grille-step assembly shown in an open position according to the concepts of the present invention.

The swing-step assembly 36 is carried by the grille frame 34 in a closed position as shown in FIGS. 2 and 4 and in an open position as shown in FIGS. 3 and 5. The swing-step assembly 36 is pivotable with respect to the grille frame 34 as will be later described in detail.

The swing-step assembly 36 includes a step frame 58 which includes a pair of opposed step brackets 60. Each step bracket 60 includes a front edge 62 and a bumper edge 64. The brackets also provide a top end 66 and a bottom end 68. Decorative holes 70 may be provided in each bracket and may be alignable with the decorative holes 48 provided by the brackets 26. As can best be seen in FIGS. 2 and 3, the front edge 62 is substantially aligned with the front edge 42 of the grille bracket 40 when in a closed position. The same is also true for the bumper edge 64 and the bumper edge 44. These edges are aligned with one another, but in some embodiments they may be flush with one another. And in other embodiments, the edges may be offset from one another.

The swing-step assembly 36 and, in particular, the step frame 58 includes a bottom crossbar 74 which connects the bottom ends of the step brackets 60 to one another. The swing step assembly also includes a step crossbar 78 which connects the top ends 66 of the brackets 60 to one another. As seen in FIG. 2, the step crossbar 78 is positioned at about a mid-point of the grille-step assembly 10 and is maintained in a substantially parallel relationship with the other crossbars 56 and 74. In the embodiments shown, the crossbars have a cylindrical shape (circular cross-section). However, other embodiments may employ bars with different cross-sectional shapes. Indeed, selected bars may have a combination cross-section where certain portions have different cross-sectional shapes than other portions. For example, the crossbars 74 and/or 78 may have a flat rectangular portion as those bars may function as steps and it would likely be more comfortable for the user to stand on the flat portion.

At a bottom of the opposed grille brackets 60, a plurality of stop holes 80 may be provided. These stop holes 80 extend through the grille bracket and are placed between the front edge and the bumper edge and each hole 80 allows for receipt of a stop pin 82. The stop pin 82 may be utilized to engage the front edge or edges of the grille brackets to stop the pivotable movement of the swing-step assembly 36 when it is lowered into the open position. Skilled artisans will appreciate that the stop pin 80 does not interfere with the closing motion when the swing-step assembly 36 is returned to the closed position.

Figure 6:
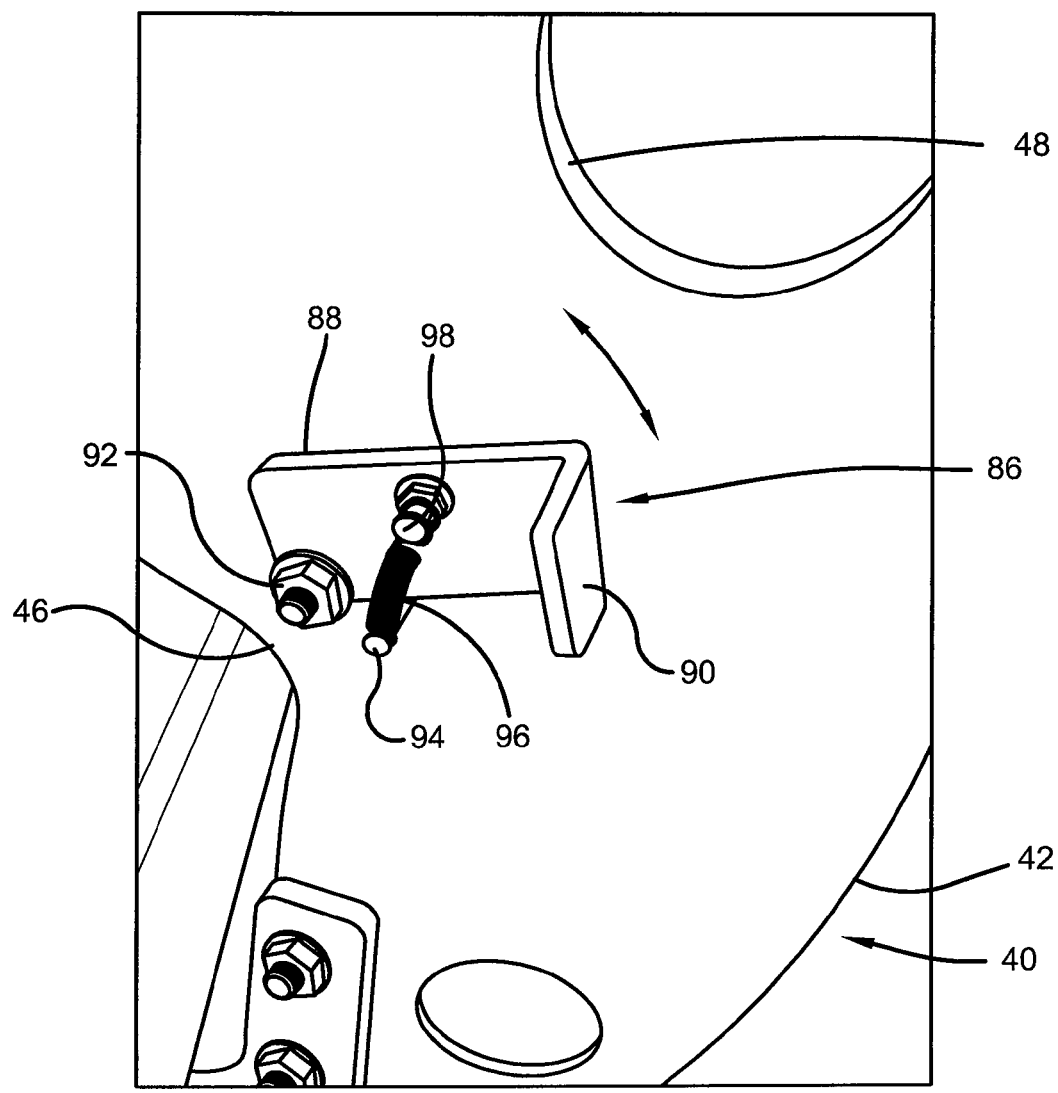
FIG. 6 is a perspective view of a latch mechanism utilized by the grille-step assembly to hold a swing step assembly to a grille frame of the grille-step assembly according to the concepts of the present invention.

As best seen in FIG. 6, a latch mechanism is designated generally by the numeral 86. The latch mechanism 86 is carried by the grille frame 34 and, in particular, by at least one of the facing surfaces of an opposed grille bracket 40. The latch mechanism 86 includes a base 88 that is substantially parallel with the facing surface of the bracket 40. A flange 90 extends substantially perpindularly inwardly from the base 88 and with respect to the facing surface of the bracket 40. The base 88 is secured to the bracket by a pivot pin 92 wherein the pivot pin 92 allows for rotatable movement of the base 88 and the flange 90. A bracket pin 94 is secured to the bracket 40 and extends inwardly in the same direction as the flange. One end of a spring 96 is secured to the bracket pin 94. Extending in substantially the same direction as the bracket pin 94 is a base pin 98 which extends from the base 88 in substantially the same direction as the flange. The opposite end of the spring 96 is secured to the base pin so as to spring bias the base 88 into a holding position. Each bracket 60, or at least one bracket 60, may provide a flange notch 100 which receives the flange 90 when the swing-step assembly 36 is in a closed position. Skilled artisans will appreciate that the latch mechanism 86 may also be provided on both brackets. The swing-step assembly 26 may be released from the grille frame 34 by manually pushing the flange 90 away from the notch 100 which allows the assembly 36 to rotate downwardly.

Figure 7:
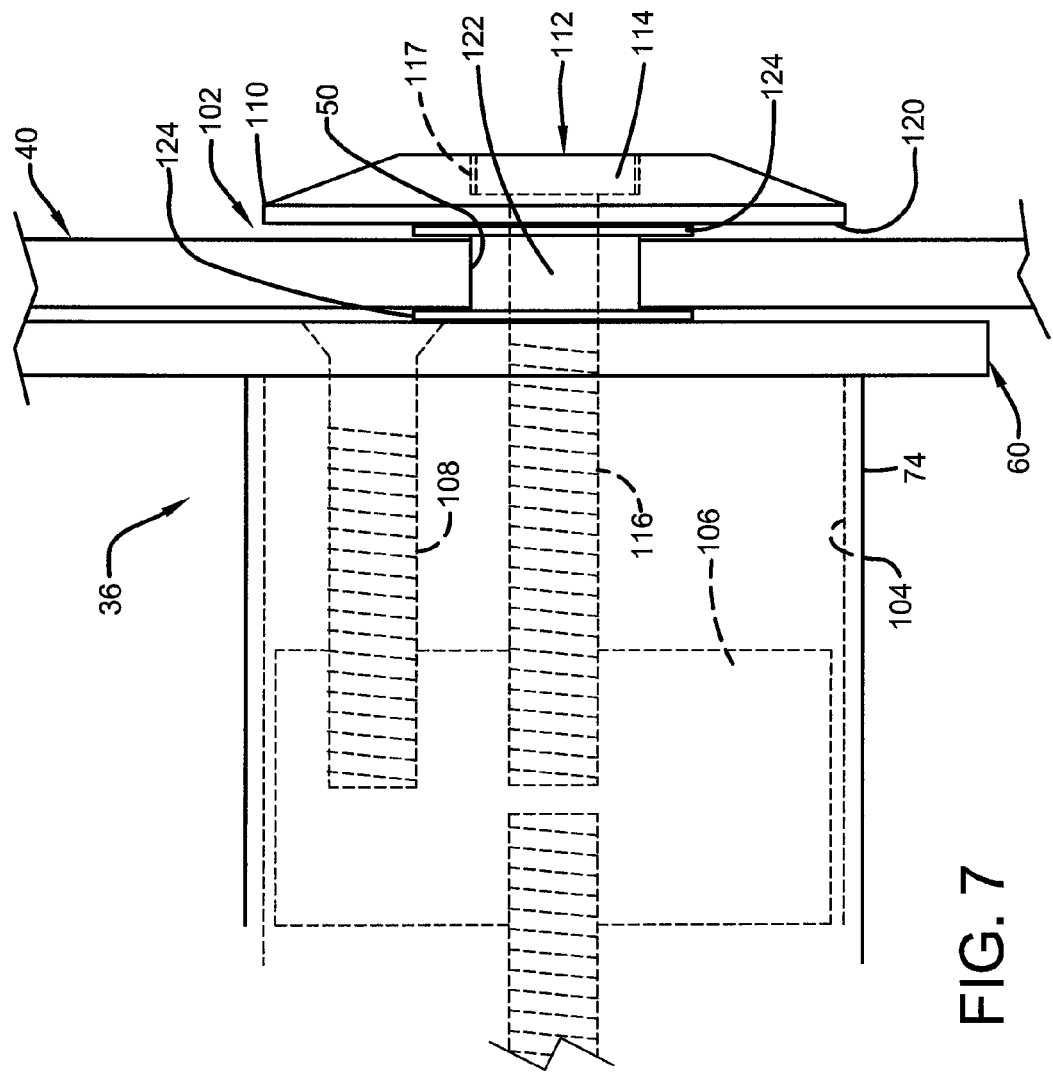
FIG. 7 is a partial detailed view of a swivel mechanism which connects the swing step assembly to the grille frame and allows the swing step assembly to pivot between the open and closed positions according to the concepts of the present invention.

Referring now to FIG. 7, it can be seen that a swivel mechanism is designated generally by the numeral 102 and provides for the pivotable/rotatable connection between the grille frame 34 and the swing-step assembly 36. The bottom crossbar 74 provides for a bar interior 104 that receives an inner bushing 106 at each end thereof. An inner fastener 108 extends through each step bracket 60 for a fixed connection to the bottom crossbar 74 and in particular the inner bushing 106. A cap 110 together with an axial fastener 112 connect the corresponding bracket 40 to the bottom crossbar 74. In particular, the axial fastener 112 includes a fastener head 114 from which extends a threaded shaft 116. The fastener head 114 may be received in recessed bore 117 provided by the cap 110. The shaft 116 extends through the respective assembly hole 50 and connects with the inner bushing 106. The cap 110 provides a bearing surface 120 positioned on or proximal to an outer facing surface of the bracket 40. An axial bushing 122 is received in each assembly hole 50 and which rotatably receives an un-threaded portion of the shaft 116 that also extends through the hole 50. A washer 124 is disposed between the bearing surface 120 and the facing surface of the bracket 40 and another washer 124 is disposed between the inner facing surface of the bracket and the step bracket 60. Skilled artisans will appreciate that this configuration allows for the swing-step assembly 36 to rotate with respect to the grille frame 34. In particular, the crossbar 74 remains fixed with respect to the connected brackets 60, while the crossbar 74 and the swing-step assembly 36 swivels with respect to the grille frame 34 when the latch mechanism 86 is disengaged.

In operation, the flange 90 is received in the flange notch 100 so as to hold the swing-step assembly 36 in a closed position with respect to the grille frame 34 as best seen in FIGS. 2 and 4. At the appropriate time, a user will deflect or pivot the flange 90 by manual force so as to dis-engage the flange 90 from the notch 100. This allows the swing-step assembly 36 and, in particular, the step frame 58 to be rotated downwardly into the open position as shown in FIGS. 3 and 5. Rotation of the swing-step assembly 36 may be stopped by the stops 82 extending inwardly from the grille brackets 40. This allows the user to step on the step crossbar and the bottom crossbar 74 to access the engine or other components maintained under the hood of the vehicle. After use of the step assembly is completed, the user may then rotate the swing-step assembly 36 upwardly, temporarily deflect the latch mechanism 86, and when the swing-step assembly is in the appropriate position, allow the spring mechanism to reengage the flange 90 with the flange notch 100.

Figure 8:
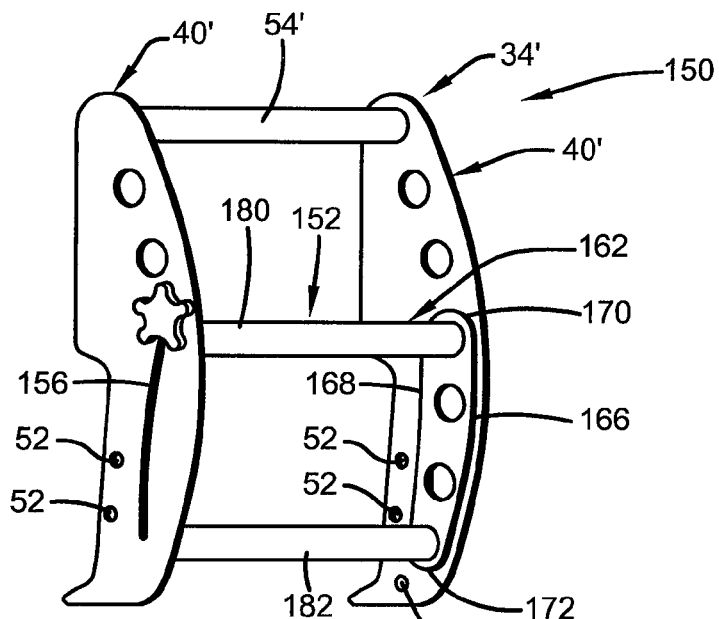
FIG. 8 is a front perspective view of an alternative grille-step assembly shown in a closed position according to the concepts of the present invention.
Figure 9:
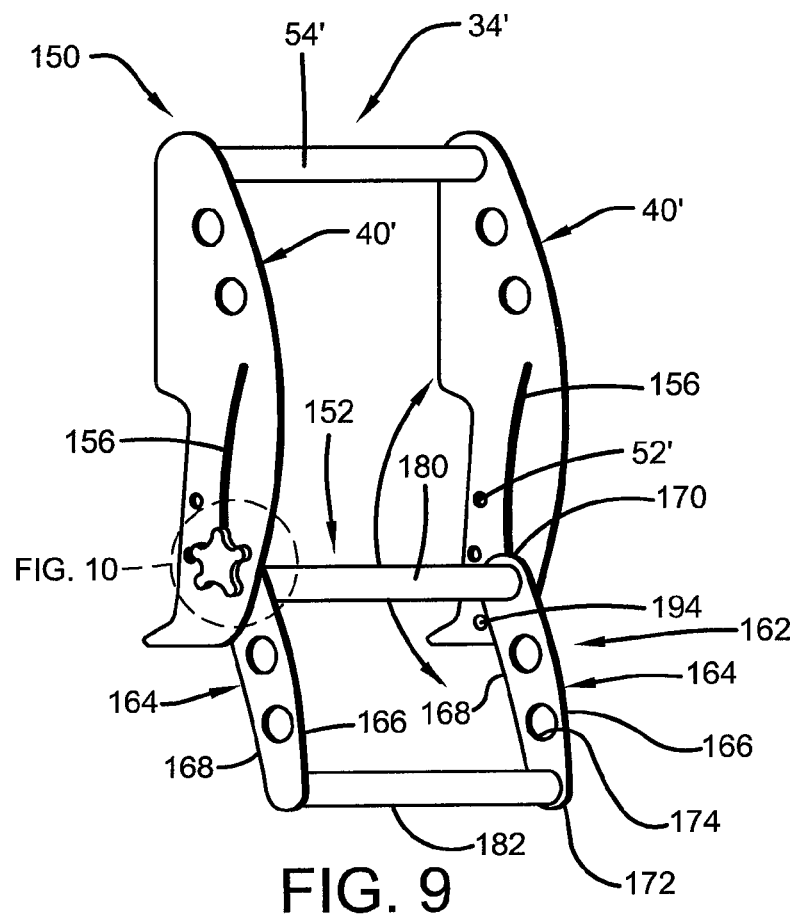
FIG. 9 is front perspective view of the alternative grille-step assembly shown in an open position according to the concepts of the present invention.
Figure 10:
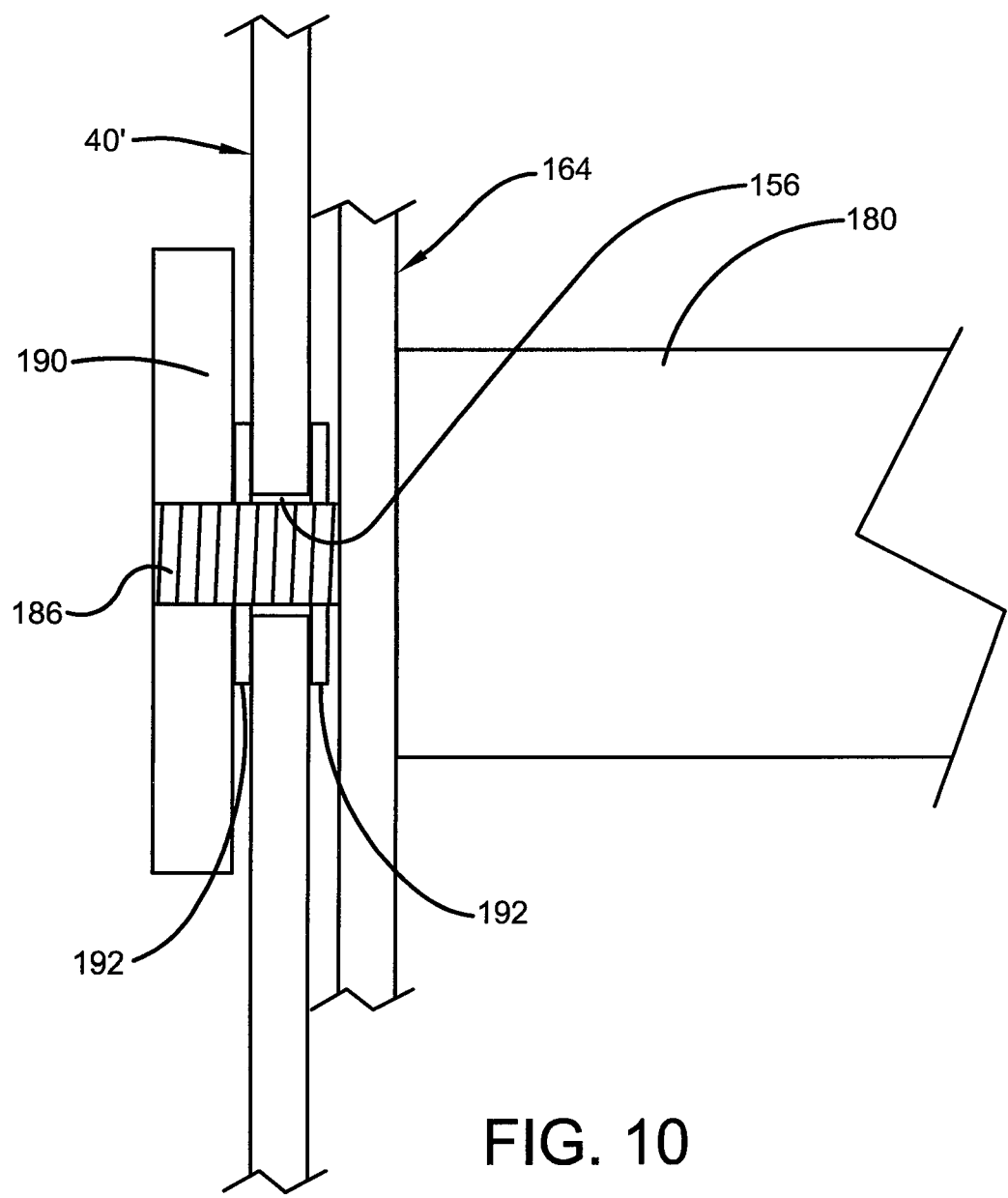
FIG. 10 is a detailed partial cross-sectional view showing the swivel mechanism utilized to connect the slide-step assembly to the grille frame according to the concepts of the present invention.

Referring now to FIGS. 8-10, it can be seen that an alternative embodiment of a grille-step assembly is designated generally by the numeral 150. In this embodiment, instead of the step assembly pivoting outwardly from the grille frame 34, a mechanism allows the two lower bars contained in the step assembly to be slidably moved downwardly.

Since a number of the components are structurally similar with the first embodiment, the components will be identified with the same numbers but with a prime designation where appropriate. The grille-step assembly 150 includes a grille frame 34' which is coupled to and associated with a slide step assembly 152. The grille frame 34' includes a pair of opposed grille brackets 40' which utilize mounting holes 54' for attachment of the grille frame 34' to a frame of the vehicle as described in the previous embodiment. Each grille bracket 40' includes a slot 156 which extends from about a midpoint of the bracket 40' toward a bottom end of the bracket. As shown, the slot 156 may be curvilinear, but the slot may be linear, or linear with curvilinear portions.

The slide step assembly 152 includes a step frame 162. The step frame 162 is constructed from a pair of opposed step brackets 164 each of which has a front edge 166 and a bumper edge 168. The brackets also provide for a top end 170 opposite a bottom end 172. A plurality of decorative holes 174 may be provided through the step brackets 164. A top crossbar 180 interconnects the step brackets 164 to one another and which appears at about a mid-point of the grille brackets when the step assembly 152 is in a closed position. A step crossbar 182 interconnects the step brackets 164 and appears at a bottom of the grille brackets when the step assembly 152 is in a closed position. As best seen in FIG. 10, opposed bar pins 184 extend axially from each end of the top crossbar 180 and are slidably received in the adjacent corresponding slot 156. Each of the bar pins has a threaded end 186 that receives a fastening nut 190. The fastening nut 190, when tightened, secures the top crossbar 180 and its associated step bracket 164 to the adjacent grille bracket 40'. Skilled artisans will appreciate that a washer 192 may be employed in between the fastening nut and the facing surface of the grille bracket 40', along with another washer 192 being disposed between the outer surface of the step bracket 164 and the inner surface of the grille bracket 40'.

In use, the fastening nuts are loosened and the slide step assembly 152 is allowed to be lowered into a usable or open position. The fastening nuts may be re-tightened at that time to hold the step assembly in place. And, as in the previous embodiment, stop pins 194 may be provided so as to provide an extra support and hold the step assembly 152 in a desired angular position. When the open position is no longer needed, the fastening nuts are loosened and the step assembly is returned to the closed position and the nuts are re-tightened.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A grille-step assembly mounted on a vehicle, comprising:
   a vehicle having a vehicle frame;
   a grille-step assembly secured to said frame;
   said grille-step assembly comprising:
      a grille frame secured to said vehicle frame, said grille frame having opposed grille brackets having at least one bar connecting said opposed grille brackets to one another;
      a step assembly comprising opposed step brackets having a bottom crossbar and a step crossbar connecting said opposed step brackets to one another, wherein said step assembly is releasably mounted such that in a closed position both said bottom crossbar and said step crossbar are positioned between said opposed grille brackets and in an open position said step assembly pivots at said bottom crossbar such that said step crossbar is positioned away from said opposed grille brackets; and
      a stop inwardly extending from at least one of said grille brackets and engaging said step assembly when in said open position, wherein said bottom crossbar is positioned between said stop and said step crossbar when the step assembly is in said closed position, and said step crossbar is positioned below said bottom crossbar when said step assembly is in said open position.

2. The grille-step assembly according to claim 1, wherein said vehicle comprises:
   a radiator grille and a bumper disposed outwardly from said radiator grille, and a hood positioned near said radiator grille, wherein said grille-step assembly is secured so as to extend outwardly from said radiator grille and said bumper and such that when said grille-step assembly is in said open position easier access to said hood is facilitated.

3. The grille-step assembly according to claim 1, further comprising:
   a latch mechanism to hold said step assembly in said closed position.

4. The grille-step assembly according to claim 3, further comprising:
   a bushing carried by each said grille-bracket, wherein said bushings are coaxial with said bottom crossbar.

5. The grille-step assembly according to claim 1, wherein each said opposed grille bracket has at least one decorative grille hole and wherein each said opposed step bracket has at least one decorative step hole which are alignable with said decorative grille holes when said step assembly is in a closed position.

6. A grille-step assembly adapted to be mounted to a vehicle frame in proximity to a vehicle hood, the assembly comprising:
   a grille frame having opposed grille brackets and at least one fixed bar extending substantially perpendicularly from and connecting said opposed grille brackets to one another and at least one of said grille brackets having an inwardly extending stop; and a step assembly having opposed step brackets and at least two crossbars extending substantially perpendicularly from and connecting said opposed step brackets to one another, wherein said step brackets are positioned adjacent and within said opposed grille brackets, wherein said step assembly is releasably mounted such that in a closed position said at least two crossbars are positioned between said opposed grille brackets and wherein in an open position a lowermost crossbar of said at least two crossbars pivots said step assembly downward such that the other of said crossbars is positioned away from said opposed grille brackets and positioned underneath said lowermost crossbar so that at least one of said step brackets engages said inwardly extending stop.

7. The grille-step assembly according to claim 6, further comprising:
  a latch mechanism to hold said step assembly in said closed position.

8. The grille-step assembly according to claim 7, where at least one of said opposed step brackets has a notch, and wherein at least one of said opposed grille brackets carries a spring-biased latch having a flange, said flange engaging said notch when in said closed position and disengaged from said slot when in said open position.

9. The grille-step assembly according to claim 6, wherein said stop is movable on said at least one grille bracket.

10. The grille-step assembly according to claim 6, wherein each said opposed grille bracket has at least one decorative grille hole and wherein each said opposed step bracket has at least one decorative step hole which are alignable with said decorative grille holes when said step assembly is in a closed position.

* * * * *